United States Patent [19]
Isogai et al.

[11] Patent Number: 6,070,682
[45] Date of Patent: Jun. 6, 2000

[54] AUTOMATIC DECELERATION CONTROL SYSTEM, VEHICLE-TO-OBSTACLE DISTANCE CONTROL SYSTEM, AND SYSTEM PROGRAM STORAGE MEDIUM FOR VEHICLE

[75] Inventors: Akira Isogai, Anjo; Kiyokazu Takagi, Toyokawa, both of Japan

[73] Assignee: Denso Corporation, Kariya, Japan

[21] Appl. No.: 08/943,190

[22] Filed: Oct. 3, 1997

[30] Foreign Application Priority Data

Oct. 4, 1996 [JP] Japan .................................. 8-264702

[51] Int. Cl.[7] ...................................................... B60T 8/00
[52] U.S. Cl. ............................ 180/167; 180/175; 701/70
[58] Field of Search ................................... 180/167, 168, 180/169, 175; 701/70, 78, 79, 96

[56] References Cited

U.S. PATENT DOCUMENTS

| | | | |
|---|---|---|---|
| 4,095,666 | 6/1978 | Baba et al. ............................... | 180/169 |
| 4,232,372 | 11/1980 | Berent ....................................... | 701/70 |
| 4,512,615 | 4/1985 | Kita et al. .................................. | 701/70 |
| 5,018,689 | 5/1991 | Yasunobu et al. ......................... | 701/70 |
| 5,096,015 | 3/1992 | Akishino et al. . | |
| 5,278,764 | 1/1994 | Iizuka et al. ............................... | 701/96 |
| 5,575,542 | 11/1996 | Tanaka et al. ........................... | 180/167 |
| 5,719,769 | 2/1998 | Brugger et al. ............................ | 701/70 |
| 5,720,534 | 2/1998 | Stumpe ...................................... | 701/70 |
| 5,742,507 | 4/1998 | Eckert ........................................ | 701/70 |

FOREIGN PATENT DOCUMENTS

| | | |
|---|---|---|
| 61-210243 | 9/1986 | Japan . |
| 1-278843 | 11/1989 | Japan . |
| 1-309829 | 12/1989 | Japan . |
| 1-309830 | 12/1989 | Japan . |
| 5-262164 | 10/1993 | Japan . |
| 5-77869 | 10/1993 | Japan . |
| 5-310106 | 11/1993 | Japan . |
| 5-310108 | 11/1993 | Japan . |

Primary Examiner—J. J. Swann
Assistant Examiner—Frank Vanaman
Attorney, Agent, or Firm—Pillsbury Madison & Sutro LLP

[57] ABSTRACT

Automatic acceleration/deceleration control for an automotive vehicle is provided which may be used in an automatic deceleration system and a vehicle-to-obstacle distance control system.

The automatic acceleration/deceleration control determines a brake pressure control command when decelerating the vehicle based on a deceleration difference between a target deceleration and an actual deceleration of the vehicle and adjusts the brake pressure acting on a wheel of the vehicle in response to the brake pressure control command to decelerate the vehicle so that the actual deceleration agrees with the target deceleration. The automatic acceleration/deceleration control further corrects the brake pressure control command by modifying the deceleration difference for compensating for a time delay between output of the brake pressure control command and a time when the vehicle is actually decelerated.

40 Claims, 5 Drawing Sheets

AUTOMATIC DECELERATION CONTROL SYSTEM, VEHICLE-TO-OBSTACLE DISTANCE CONTROL SYSTEM, AND SYSTEM PROGRAM STORAGE MEDIUM FOR VEHICLE

BACKGROUND OF THE INVENTION

1. Technical Field of the Invention

The present invention relates generally to an automatic deceleration control system, a vehicle-to-obstacle distance control system, and a system program storage medium, and more particularly to an automatic deceleration control system designed to determine a difference between a target deceleration and an actual deceleration during braking to regulate the braking fluid pressure acting on wheels so that the actual deceleration follows up the target deceleration, a vehicle-to-obstacle distance control system designed to control the speed of the vehicle to bring the distance to an obstacle in front of the vehicle into agreement with a target value, and a storage medium in which a system program of the automatic deceleration control system or the vehicle-to-obstacle distance control system is stored.

2. Background of Related Art

An automatic braking system for automotive vehicles is known in the art which is designed to monitor the distance between a controlled vehicle and an obstacle present ahead of the controlled vehicle and a relative speed to the obstacle using optical techniques or ultrasonic waves to determine the possibility of collision with the obstacle and to turn on a brake actuator if the possibility of collision shows a high level to brake each wheel so as to keep the distance to the obstacle constant for avoiding an accidental collision.

The automatic braking system includes a deceleration detector which detects an actual deceleration of the controlled vehicle and a correcting circuit which determines a difference between the actual deceleration and a target deceleration and corrects a control signal outputted to the brake actuator based on the difference. This system does not always bring the actual deceleration of the controlled vehicle into exact coincidence with the target deceleration and has a dead band within which the pressure regulation of brake oil through the brake actuator is arrested when the difference between the actual deceleration and the target deceleration falls within a given range. The brake actuator includes pressure-rising and pressure-reducing valves each of which is turned on and off in preselected duty cycles to increase or decrease the pressure of the brake oil in stepwise fashion.

Japanese Patent First Publication No. 5-310108 teaches an automatic braking system of the type, as discussed above, which is also designed to alleviate the problem that vibrations occur near a target deceleration by narrowing a brake control dead band. This conventional system, however, has the drawback in that when it is required to change a target acceleration or deceleration moderately, that is, when a difference between the target acceleration or deceleration and an actual acceleration or deceleration is small, a duty factor of a control signal outputted to a brake actuator is so set as to increase the pressure of brake oil slowly, thereby resulting in a time delay between output of the control signal to the brake actuator and a time when the vehicle is decelerated actually.

SUMMARY OF THE INVENTION

It is therefore a principal object of the present invention to avoid the disadvantages of the prior art.

It is another object of the present invention to provide an automatic deceleration control system and a vehicle-to-obstacle distance control system for an automotive vehicle which are designed to control deceleration of the vehicle in quick response.

It is a further object of the present invention to provide a storage medium in which a program or logical steps to be performed by a computer installed in an automatic deceleration control system or a vehicle-to-obstacle distance control system mounted in an automotive vehicle to control deceleration of the vehicle in quick response, is stored.

According to one aspect of the present invention, there is provided an automatic deceleration control method for a vehicle comprising the steps of: (a) determining a brake pressure control command when decelerating the vehicle based on a deceleration difference between a target deceleration which is determined according to a driving condition of the vehicle and an actual deceleration of the vehicle so that the actual deceleration follows up the target deceleration: (b) correcting the brake pressure control command by modifying the deceleration difference for compensating for a time delay between output of the brake pressure control command and a time when the vehicle is actually decelerated in response to the brake pressure control command; and (c) adjusting a brake pressure acting on a wheel of the vehicle in response to the corrected brake pressure control command to decelerate the vehicle.

In the preferred mode of the invention, the correcting step advances the phase of the target deceleration for compensating for the time delay.

The advance in phase of the target deceleration is accomplished using the deceleration difference between the target deceleration and the actual deceleration and a change in target deceleration into account.

The change in target deceleration is a measure of a change in target deceleration over a given period of time.

The change in target deceleration may be a value derived by differentiating the target deceleration with respect to time.

The correcting step may alternatively advance the phase of the deceleration difference between the target deceleration and the actual deceleration.

The advance in phase of the deceleration difference is accomplished using a change in difference between the target deceleration and the actual deceleration.

The change in deceleration difference is a measure of a change in the difference over a given period of time.

The change in the deceleration difference may be a value derived by differentiating a difference between the target deceleration and the actual deceleration with respect to time.

The target deceleration may be determined based on an actual vehicle speed by look-up using target deceleration maps which show relations between the driving condition and the target deceleration for preselected different vehicle speeds.

The target deceleration may alternatively be determined by performing a weighted averaging operation on two target decelerations derived from two of the target deceleration maps corresponding to two of the preselected different vehicle speeds across the actual vehicle speed based on the two preselected different vehicle speeds and the actual vehicle speed.

According to the second aspect of the invention, there is provided a storage medium storing therein a program to be executed by a computer, the program comprising the logical steps: (a) determining a brake pressure control command when decelerating the vehicle based on a deceleration difference between a target deceleration which is determined according to a driving condition of the vehicle and an actual deceleration of the vehicle so that the actual deceleration follows up the target deceleration: (b) correcting the brake pressure control command by modifying the deceleration difference for compensating for a time delay between output of the brake pressure control command and a time when the vehicle is actually decelerated in response to the brake pressure control command; and (c) adjusting a brake pressure acting on a wheel of the vehicle in response to the corrected brake pressure control command to decelerate the vehicle.

According to the third aspect of the invention, there is provided a distance control method for controlling a distance between a vehicle and an obstacle present ahead of the vehicle comprising the steps of: (a) determining a brake pressure control command when decelerating the vehicle based on a deceleration difference between a target deceleration which is determined according to a driving condition of the vehicle and an actual deceleration of the vehicle so that the actual deceleration follows up the target deceleration: (b) correcting the brake pressure control command by modifying the deceleration difference for compensating for a time delay between output of the brake pressure control command and a time when the vehicle is actually decelerated in response to the brake pressure control command; and (c) adjusting a brake pressure acting on a wheel of the vehicle in response to the corrected brake pressure control command to decelerate the vehicle to bring the distance between the vehicle and the obstacle into agreement with a preselected target distance.

According to the fourth aspect of the invention, there is provided a storage medium storing therein a program to be executed by a computer, the program comprising the logical steps: (a) determining a brake pressure control command when decelerating the vehicle based on a deceleration difference between a target deceleration which is determined according to a driving condition of the vehicle and an actual deceleration of the vehicle so that the actual deceleration follows up the target deceleration: (b) correcting the brake pressure control command by modifying the deceleration difference for compensating for a time delay between output of the brake pressure control command and a time when the vehicle is actually decelerated in response to the brake pressure control command; and (c) adjusting a brake pressure acting on a wheel of the vehicle in response to the corrected brake pressure control command to decelerate the vehicle to bring the distance between the vehicle and the obstacle into agreement with a preselected target distance.

According to the fifth aspect of the invention, there is provided an automatic deceleration control apparatus for a vehicle comprising: (a) a deceleration detecting sensor detecting an actual deceleration of the vehicle; (b) driving condition determining means for determining a driving condition of the vehicle; (c) a target deceleration determining means for determining a target deceleration according to the driving condition of the vehicle determined by the driving condition determining means; (d) a deceleration difference determining means for determining a deceleration difference between the target deceleration and the actual deceleration detected by the deceleration detecting sensor; (e) a brake pressure control command determining means for determining a brake pressure control command when decelerating the vehicle based on the deceleration difference determined by the deceleration difference determining means; (f) a correcting means for correcting the brake pressure control command by modifying the deceleration difference so as to compensate for a time delay between output of the brake pressure control command and a time when the vehicle is actually decelerated in response to the brake pressure control command; and (g) a brake actuator adjusting a brake pressure acting on a wheel of the vehicle in response to the corrected brake pressure control command to decelerate the vehicle.

In the preferred mode of the invention, the correcting means advances the phase of the target deceleration for compensating for the time delay.

The advance in phase of the target deceleration is accomplished using the deceleration difference between the target deceleration and the actual deceleration and a change in target deceleration into account.

The change in target deceleration is a measure of a change in target deceleration over a given period of time.

The target deceleration may be a value derived by differentiating the target deceleration with respect to time.

The correcting means may alternatively advance the phase of the deceleration difference between the target deceleration and the actual deceleration.

The advance in phase of the deceleration difference is accomplished using a change in difference between the target deceleration and the actual deceleration.

The change in deceleration difference is a measure of a change in the difference over a given period of time.

The change in the deceleration difference may be a value derived by differentiating a difference between the target deceleration and the actual deceleration with respect to time.

The target deceleration is determined based on a vehicle speed measured by a vehicle speed sensor by look-up using target deceleration maps which show relations between the driving condition and the target deceleration for preselected different vehicle speeds.

The target deceleration is blurred in time sequence.

The target deceleration is determined by performing a weighted averaging operation on two target decelerations derived from two of the target deceleration maps corresponding to two of the preselected different vehicle speeds across the actual vehicle speed based on the two preselected different vehicle speeds and the vehicle speed.

According to the sixth aspect of the invention, there is provided a distance control apparatus for controlling a distance between a vehicle and an obstacle present ahead of the vehicle comprising: (a) a deceleration detecting sensor detecting an actual deceleration of the vehicle; (b) a driving condition determining means for determining a driving condition of the vehicle; (c) a target deceleration determining means for determining a target deceleration according to the driving condition of the vehicle determined by the driving condition determining means; (d) a deceleration difference determining means for determining a deceleration difference between the target deceleration and the actual deceleration detected by the deceleration detecting sensor; (e) a brake pressure control command determining means for determining a brake pressure control command when decelerating the vehicle based on the deceleration difference determined by the deceleration difference determining means; (f) a correcting means for correcting the brake pressure control command by modifying the deceleration difference so as to compensate for a time delay between output of the brake pressure control command and a time when the vehicle is actually decelerated in response to the brake pressure control command; and (g) a brake actuator adjusting a brake pressure acting on a wheel of the vehicle in response to the corrected brake pressure control command to decelerate the vehicle to bring the distance between the vehicle and the obstacle into agreement with a preselected target distance.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
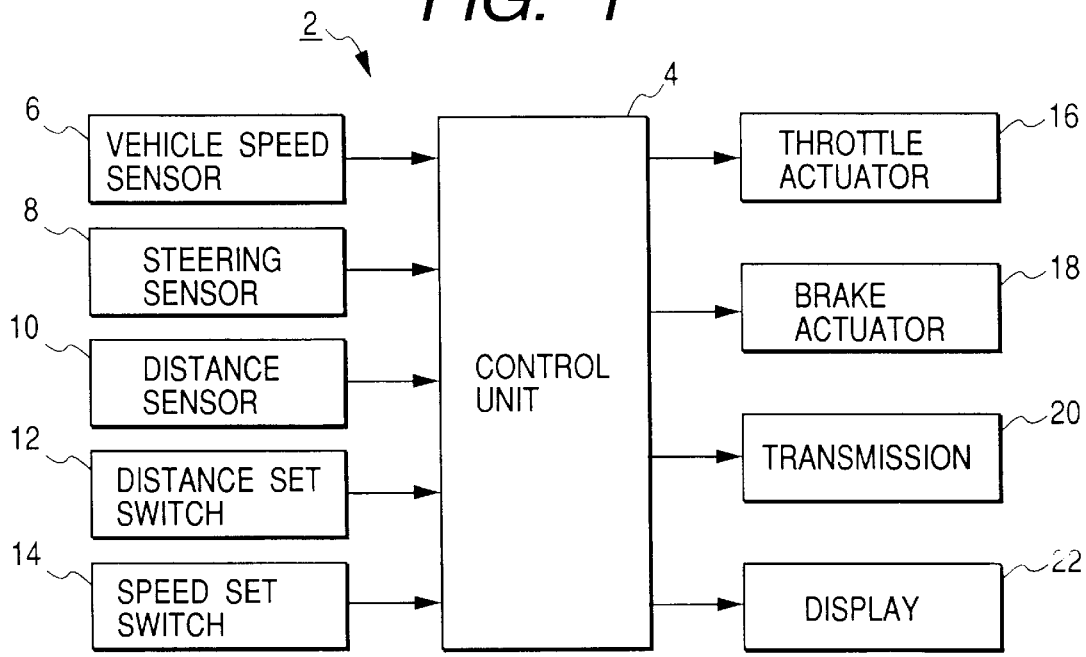
FIG. 1 is a block diagram which shows a vehicle-to-obstacle distance control system according to the present invention.

Referring now to the drawings, particularly to FIG. 1, there is shown a vehicle-to-obstacle distance control system 2 according to the present invention which is installed in this embodiment in an automotive vehicle powered by a gasoline engine.

The vehicle-to-obstacle distance control system 2 is designed to control the driving force of the vehicle equipped with this system (hereinafter, will be referred to as a controlled vehicle) so as to bring the distance between the controlled vehicle and an obstacle in front such as a preceding vehicle into agreement with a target distance. The vehicle-to-obstacle distance control system 2 includes a control unit 4, a vehicle speed sensor 6, a steering sensor 8, a distance sensor 10, a following distance set switch 12, a vehicle speed set switch 14, a throttle actuator 16, a brake actuator 18, a transmission 20, and a control information display 22.

The control unit 4 consists of a microcomputer having a ROM, a RAM 23 and an I/O device and connects with a storage battery mounted in the vehicle through an ignition switch. The control unit 4 is activated upon turning on of the ignition switch to execute control programs, as will be discussed later in detail.

The vehicle speed sensor 6 monitors the speed of the controlled vehicle. The distance sensor 10 may take the form of a conventional radar system that provides a measure of the distance to a target within a front detection zone.

The following distance set switch 12 is manually operated by a vehicle operator to set a target following distance between the controlled vehicle and a preceding vehicle in an automatic drive control mode. The vehicle speed set switch 14 is manually operated by the vehicle operator to set a target constant speed at which the controlled vehicle is to travel in the automatic drive control mode. The target following distance may alternatively be changed according to the speed of the controlled vehicle.

The control unit 4 receives signals outputted from the sensors 6, 8, 10, and the switches 12 and 14 through an input buffer (not shown) to execute a control program stored in the ROM and provides control signals to the throttle actuator 16, the brake actuator 18, and a driving circuit of a transmission actuator of the transmission 20, and the control information display 22. The throttle actuator 16 regulates an opening of a throttle valve installed in an intake system of the engine. The brake actuator 18 turns on and off a pressure-rising valve and a pressure-reducing valve installed in a hydraulic braking circuit to regulate the pressure of brake oil acting on wheels of the vehicle. The control information display 22 is disposed in a dash board and visually indicates control information about parameters set by the distance set switch 12 and the vehicle speed set switch 14 and controlled conditions of the vehicle.

The control program to be performed by the control unit 4 may be stored in a portable storage medium such as a floppy disc, a photomagnetic disc, and a CD-ROM and used by loading the storage medium into the control unit 4 as needed. The control program may alternatively be stored in a backup RAM installed in the control unit 4.

The driving circuit of the transmission actuator is responsive to a control signal from the control unit 4 to control an electric motor and a magnetic clutch installed in the transmission actuator. For example, the motor is controlled in rotational direction and speed thereof by the driving circuit, and the clutch, when energized, transmits output torque of the motor to the throttle valve, thereby regulating output torque of the engine to control the speed of the vehicle.

An accelerator pedal (not shown) is connected to the throttle valve in a conventional manner so that the opening of the throttle valve is changed according to a pedal effort or pedal stroke. The depression of the accelerator pedal and operation of the motor may be performed independently of each other, however, the opening of the throttle valve is determined by the accelerator pedal or the motor, which ever opens the throttle valve more greatly. Therefore, even if the motor is controlled to close the throttle valve fully, depression of the accelerator pedal will cause the throttle valve to be opened. Conversely, even if the accelerator pedal is not depressed by the vehicle operator, rotation of the motor in a valve-opening direction will cause the throttle valve to be opened. Such a structure is well known in the art, and explanation thereof in detail will be omitted here.

Figure 2:
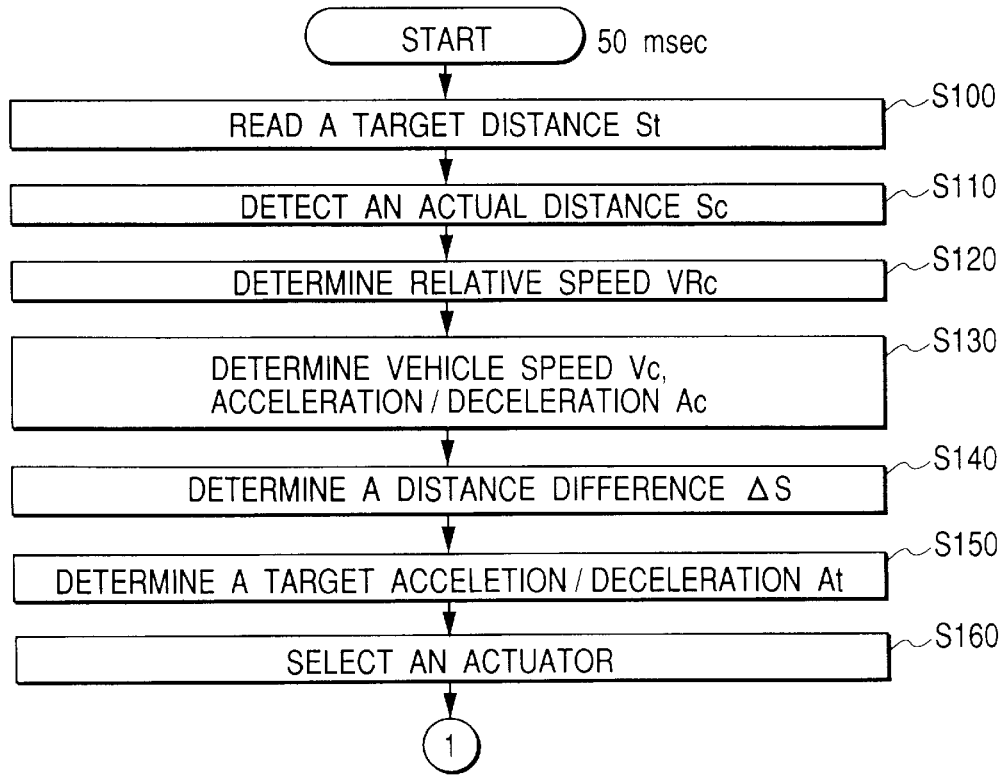
FIG. 2 show a flowchart of a program or logical steps performed in the vehicle-to-obstacle distance control system, as shown in FIG. 1, for automatically controlling the deceleration of a controlled vehicle.
Figure 3:
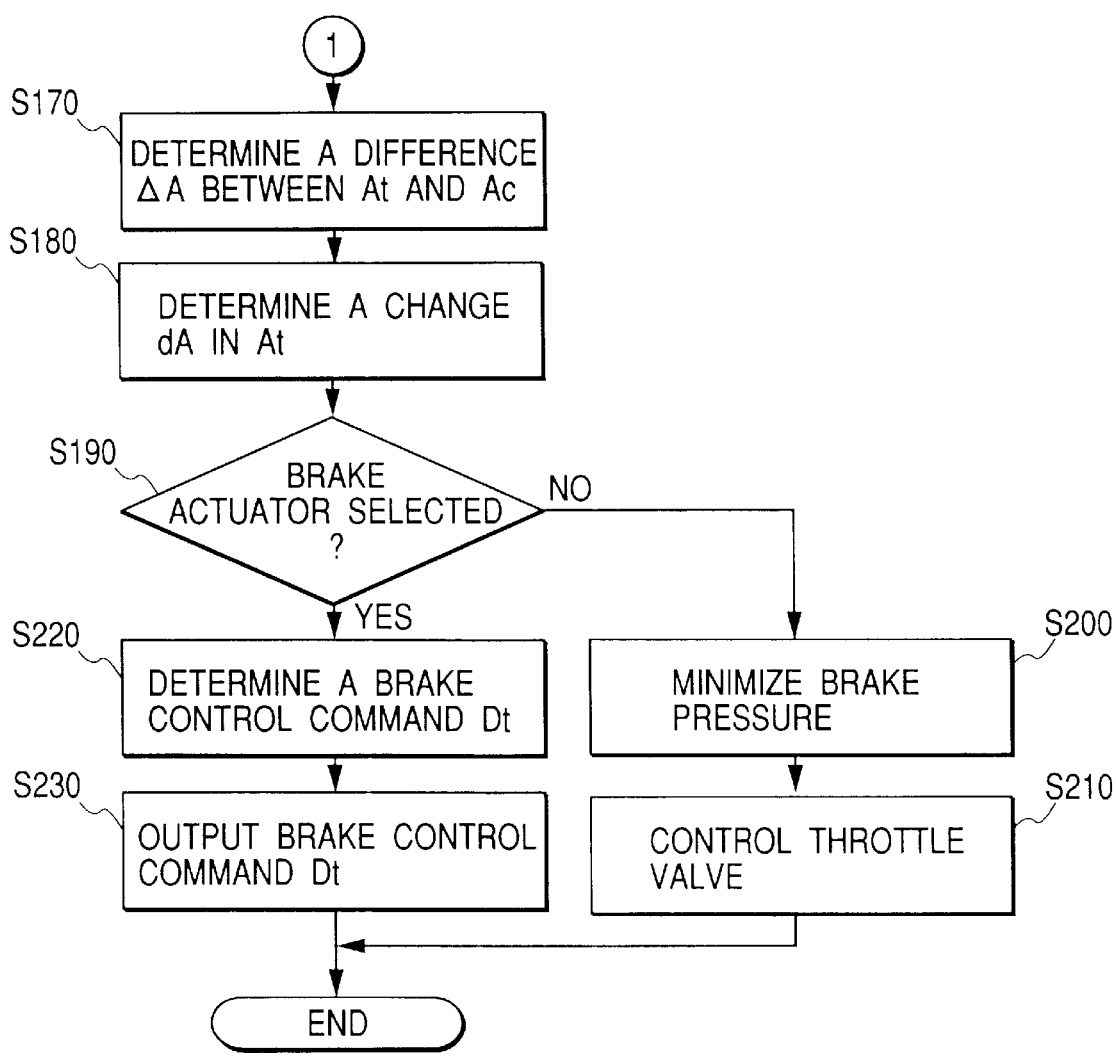
FIG. 3 is a flowchart of a program or logical steps performed in the vehicle-to-obstacle distance control system, as shown in FIG. 1, for automatically controlling the deceleration of a controlled vehicle.

FIGS. 2 and 3 show a flowchart of a program or logical steps performed by the control unit 4 in response to turning on of the ignition switch. This program is carried out every preselected control cycle T, for example, 50 msec.

After entering the program, the routine proceeds to step 100 wherein a target following distance St selected by the following distance set switch 12 is read.

The routine proceeds to step 110 wherein an actual distance Sc between the controlled vehicle and an obstacle present within the front detection zone such as a preceding vehicle is determined based on a sensor signal outputted from the distance sensor 10. The routine proceeds to step 120 wherein a variation in distance Sc per unit time is determined to derive a relative speed VRc of the controlled vehicle to the detected obstacle. The routine proceeds to step 130 wherein a vehicle speed Vc is determined based on a sensor signal from the vehicle speed sensor 6, and a variation in vehicle speed Vc per unit time (i.e., a change rate of the vehicle speed Vc) is determined to derive an actual acceleration/deceleration value Ac.

The routine proceeds to step 140 wherein a distance difference ΔS between the target following distance St derived in step 100 and the actual distance Sc (=St−Sc) is determined.

The routine proceeds to step 150 wherein a target acceleration/deceleration value At is determined based on the relative speed VRc derived in step 120, the vehicle speed Vc derived in step 130, and the distance difference ΔS derived in step 140. When the target acceleration/deceleration value At is greater than zero (At>0), it represents a target acceleration, while when the target acceleration/deceleration value At is smaller than zero (At<0), it represents a target deceleration.

Figure 4:
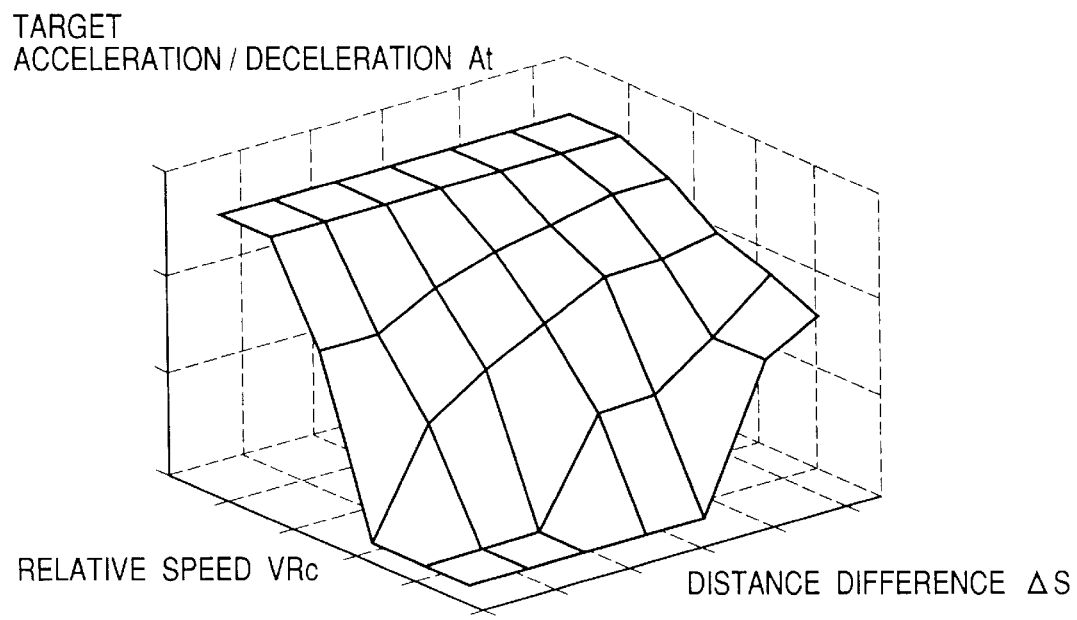
FIG. 4 shows a map for determining a target deceleration At based on a relative vehicle speed VRc and a distance difference ΔS between a target following distance and an actual distance.
Figure 5:
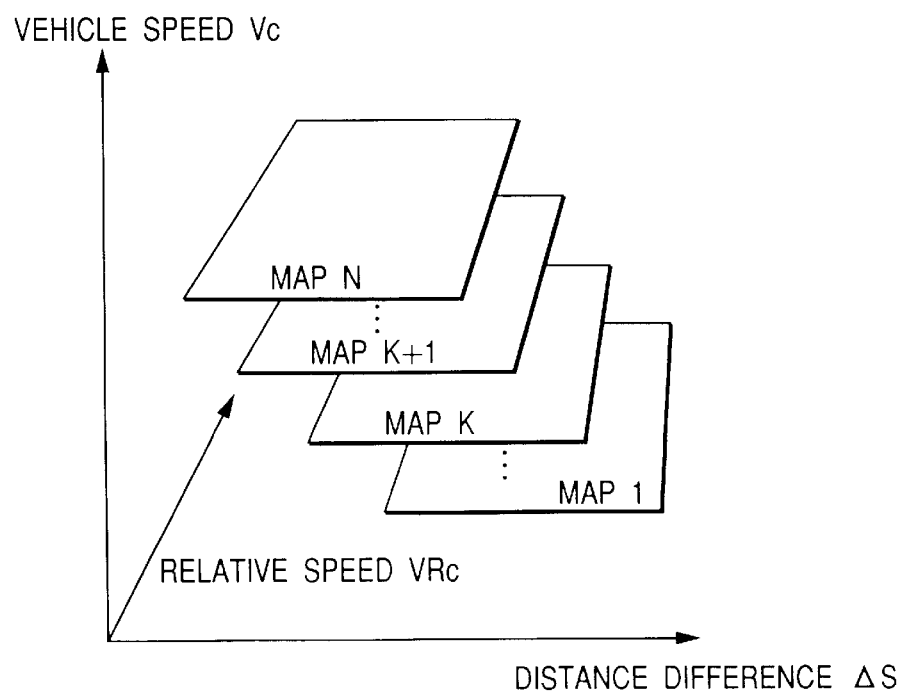
FIG. 5 shows a plurality of maps provided for different vehicle speeds.

The determination of the target acceleration/deceleration value At in step 150 is made by look-up using a map, as shown in FIG. 4, based on the relative speed VRc and the distance difference ΔS. The map in FIG. 4 is selected from N maps, as shown in FIG. 5, according to the vehicle speed Vc. Specifically, one of the maps which indicates the vehicle speed closest to the vehicle speed Vc derived in step 130 is selected to determine the target acceleration/deceleration value At in terms of the distance difference ΔS and the relative speed VRc.

After the target acceleration/deceleration value At is determined, the routine proceeds to step 160 wherein an actuator to be controlled is determined. Specifically, if the target acceleration/deceleration value At is greater than zero (At>0) meaning that the controlled vehicle should be accelerated, the throttle actuator 16 is selected. Alternatively, if the target acceleration/deceleration value At is smaller than zero (At<0) meaning that the controlled vehicle should be decelerated, the brake actuator 18 is selected.

The routine proceeds to step 170, as shown in FIG. 3, wherein a difference ΔA between the target acceleration/deceleration value At derived in step 150 and the actual acceleration/deceleration value Ac derived in step 130 is determined.

The routine proceeds to step 180 wherein a difference dA is determined by subtracting the target acceleration/deceleration value At derived one program cycle before from the target acceleration/deceleration value At derived in this program cycle which indicates a change in target acceleration/deceleration value At per unit time. This unit time is very short, as much as 50 msec that is a program execution cycle, so that the difference dA may be considered as a value differentiated with respect to time.

The routine proceeds to step 190 wherein it is determined whether the brake actuator 18 has been selected in step 160 or not. If a NO answer is obtained meaning that the target acceleration/deceleration value At is greater than zero (At>0) so that the controlled vehicle should be accelerated by activating the throttle actuator 16, then the routine proceeds to step 200 wherein a minimum brake pressure command is provided to the brake actuator 18 to regulate the pressure of brake fluid acting on wheels to a minimum level. The routine proceeds to step 210 wherein a throttle open command is provided to the throttle actuator 16 to control the throttle valve according to the difference ΔA derived in step 170.

If a YES answer is obtained in step 190 meaning that the target acceleration/deceleration value At is smaller than zero (At<0) so that the controlled vehicle should be decelerated by activating the brake actuator 18, then the routine proceeds to step 220 wherein a brake control command Dt is determined based on the difference ΔA derived in step 170 and the difference dA derived in step 180 according to the equation (1) below.

$$Dt \leftarrow K1 \cdot \Delta A + K2 \cdot dA \qquad (1)$$

where Dt indicates a duty factor of the brake control command outputted to the brake actuator 18, and K1 and K2 are given coefficients. Specifically, K1 is so determined that as an absolute value of ΔA becomes great, Dt is increased to increase the braking force quickly. K2 is so determined that as dA becomes great meaning that the degree to which the target acceleration/deceleration value At is changed to increase a measure of deceleration is increased, Dt is increased.

The routine proceeds to step 230 wherein the brake control command Dt derived in step 220 is provided to the brake actuator 18.

The above control brings the actual acceleration/deceleration value Ac into agreement with the target acceleration/deceleration value At so that the actual distance Sc between the controlled vehicle and the detected obstacle approaches the target following distance St.

As apparent from the above discussion, the vehicle-to-obstacle distance control system 2 of this embodiment is designed to determine the brake control command Dt outputted to the brake actuator 18 based on the difference ΔA between the target acceleration/deceleration value At and the actual acceleration/deceleration value Ac taking into account the difference dA indicating a change in target acceleration/deceleration value At per unit time (i.e., which advances the phase of the target acceleration/deceleration value At), thereby compensating for a time lag between output of a command to accelerate or decelerate the controlled vehicle and a time when the controlled vehicle is accelerated or decelerated actually in the automatic drive mode to bring the actual acceleration/deceleration value Ac into agreement with the target acceleration/deceleration value At determined based on the relative speed VRc and the distance difference ΔS.

Specifically, the phase of the target acceleration/deceleration value At is advanced in the equation (1) by adding the product of dA and K2 to the product of K1 and ΔA, thereby deriving the brake control command Dt taking into account a subsequent change in target acceleration/deceleration value At.

Figure 6A:
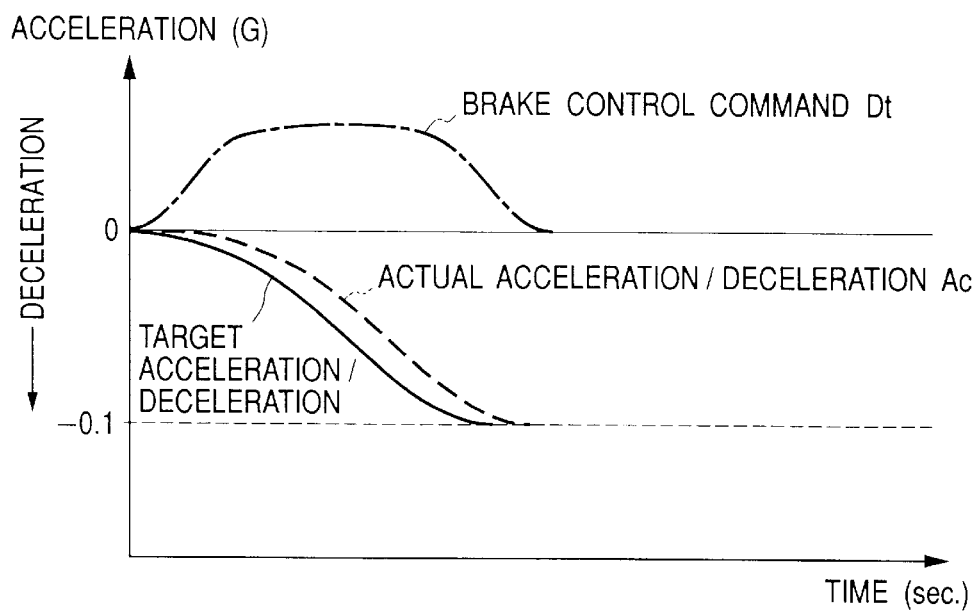
FIG. 6(a) is a time chart which shows the relation among a brake control command Dt, an actual acceleration/deceleration value Ac, and a target acceleration/deceleration value At in the vehicle-to-obstacle distance control system as shown in FIG. 1.
Figure 6B:
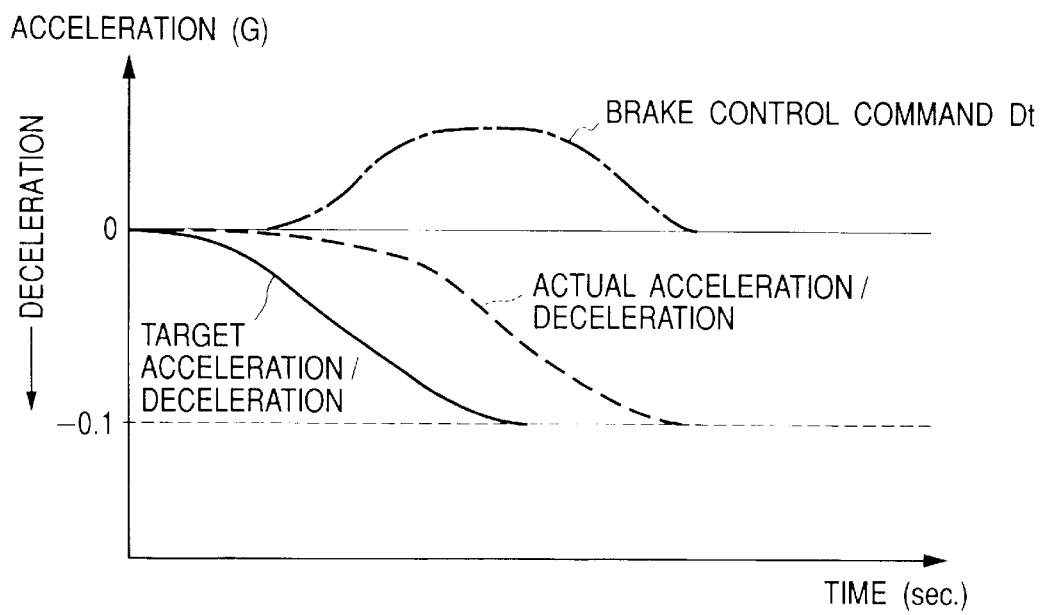
FIG. 6(b) is a time chart which shows the relation among a brake control command Dt, an actual acceleration/deceleration value Ac, and a target acceleration/deceleration value At in a conventional vehicle-to-obstacle distance control system.

A conventional system, as described previously, determines the brake control command Dt only based on the difference ΔA between the target acceleration/deceleration value At and the actual acceleration/deceleration value Ac, which results in delay in rising of the brake control command Dt, as shown in FIG. 6(b), causing a change in actual acceleration/deceleration value Ac to be delayed, however, the vehicle-to-obstacle distance control system 2 of this embodiment determines the brake control command Dt, as discussed above, based on the difference ΔA between the target acceleration/deceleration value At and the actual acceleration/deceleration value Ac and the difference dA that is a change in target acceleration/deceleration value At per unit time, thereby resulting in quick rising of the brake control command Dt, as shown in FIG. 6(*a*), so that the actual acceleration/deceleration value Ac reaches the target acceleration/deceleration value At quickly. This makes it possible to keep the distance between the control vehicle and the detected obstacle near the target following distance at all times.

Instead of the equation (1), the equation (2) below may be used which utilizes a change dΔA in difference ΔA between the target acceleration/deceleration value At and the actual acceleration/deceleration value Ac to advance the phase of the difference ΔA.

$$Dt \leftarrow K1 \cdot \Delta A + K2 \cdot d\Delta A \qquad (2)$$

where K1 and K2 may be equal to those in the equation (1) or alternatively be different values as long as K1 is so determined that as an absolute value of ΔA becomes great, Dt is increased, and K2 is so determined that as dΔA that is a change in difference ΔA becomes great meaning that the degree to which the target acceleration/deceleration value At is shifted from an actual deceleration in a direction to increase a measure of deceleration is increased, Dt is increased.

As different from the equation (2) using the change dΔA in difference ΔA between the target acceleration/deceleration value At and the actual acceleration/deceleration value Ac, in the equation (1) which advances the phase of the target acceleration/deceleration value At using the product of dA and K2, the difference dA that is a change in the target acceleration/deceleration value At is not affected by the actual acceleration/deceleration value Ac at all. In general, relatively great noise components may appear at the actual acceleration/deceleration value Ac. The equation (1) is, therefore, preferable to the equation (2) because the use of the difference dA serves to eliminate the influence of the noise components contained in the actual acceleration/deceleration value Ac on determination of the brake control command Dt.

More comfortable speed control is achieved by selecting one from the maps, as shown in FIG. 5, which provides a greater target acceleration/deceleration value At in a low-speed range within which the number of times the controlled vehicle is accelerated or decelerated quickly is great and selecting another which provides a smaller target acceleration/deceleration value At in a high-speed range within which the number of times the controlled vehicle is accelerated or decelerated slowly is great.

It is advisable that the maps be determined according to the performance of a vehicle. A single map may be used as needed.

The above described embodiment exemplifies the acceleration/deceleration control used with the vehicle-to-obstacle system 2, however, the acceleration/deceleration control, as discussed above, may also be used with an automatic deceleration control system which monitors the distance to an obstacle present ahead of the controlled vehicle and decelerates the controlled vehicle when the monitored distance lies within an alert distance range.

Figure 7:
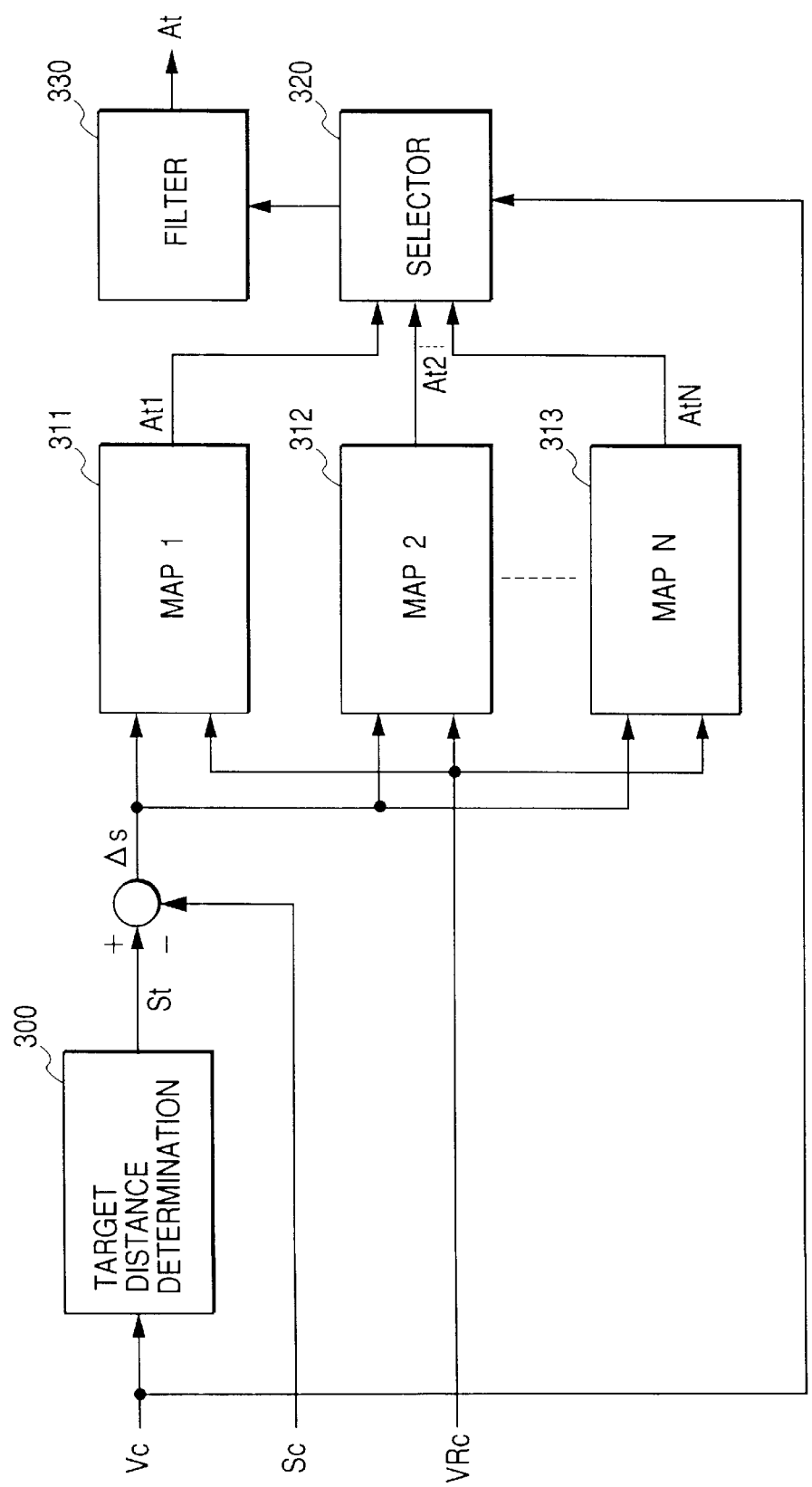
FIG. 7 is a block diagram which shows a vehicle-to-obstacle distance control system according to the second embodiment of the present invention.

FIG. 7 shows a vehicle-to-obstacle distance control system according to the second embodiment of the invention. The hardware and software for determining the vehicle speed Vc, the distance Sc between the controlled vehicle and an obstacle in front such as a preceding vehicle, and the relative speed VRc between the controlled vehicle and the obstacle are identical with those of the above first embodiment, and explanation thereof in detail will be omitted here.

The vehicle-to-obstacle control system includes a target following distance determining circuit 300, N target acceleration/deceleration maps 311, 312, and 313 which are identical with those shown in FIGS. 4 and 5, a selector 320, and a filter 330.

The target following distance determining circuit 300 determines the target following distance St based on the actual vehicle speed Vc to determine the distance difference ΔS between the target following distance St and the actual distance Sc to the obstacle present ahead of the controlled vehicle and also determines target acceleration/deceleration values At1 to AtN based on the relative speed VRc and the distance difference ΔS by look-up using the target acceleration/deceleration maps 1 to N (311, 312, 313). The selector 320 selects one from the target acceleration/deceleration maps 1 to N based on the vehicle speed Vc monitored by the vehicle speed sensor 6 to determine corresponding one of the acceleration/deceleration values At1 to AtN and outputs it to the filter 330. The filter 330 serves to smooth a stepwise change in target acceleration/deceleration value occurring when one of the target acceleration/deceleration maps 1 to N selected in the selector 320 is switched to another upon change in vehicle speed Vc. Specifically, the filter 330 performs a function of blurring one of the target acceleration/deceleration values At1 to AtN selected by the selector 320 in time sequence.

The above described second embodiment, similar to the first embodiment, may be used with an automatic deceleration control system which monitors the distance to an obstacle present ahead of the controlled vehicle and decelerates the controlled vehicle when the monitored distance lies within an alert distance range.

The third embodiment of the acceleration/deceleration control of the invention will be discussed below which is different from the second embodiment, as shown in FIG. 7, in that the selector 320 smoothes, without use of the filter 330, the stepwise change in target acceleration/deceleration value occurring when one of the target acceleration/deceleration maps 1 to N selected in the selector 320 is switched to another according to change in vehicle speed Vc. Other arrangements are identical, and explanation thereof in detail will be omitted here.

Specifically, when the vehicle speed Vc lies near a vehicle speed Vk at the boundary between a vehicle speed range Lk within which kth of the target acceleration/deceleration maps 1 to N, which will be referred to as the target acceleration/deceleration map k, is selected and a vehicle speed range L(k+1) within subsequent one (i.e., (k+1)th) of the target acceleration/deceleration maps 1 to N, which will be referred to as the target acceleration/deceleration map k+1, is selected, the selector 320 determines the target acceleration/deceleration value At in a manner, as described below, which establishes a continuous or smooth change in target acceleration/deceleration value At between a target acceleration/deceleration value Atk derived in the map K and a target acceleration/deceleration value At(k+1) derived in the map K+1.

If the equation (3) below is met, the target acceleration/deceleration value At is determined according to the equation (4) below.

$$Vk-\Delta V \leq Vc \leq Vk+\Delta V \quad (3)$$

$$At \leftarrow Atk \cdot (1-(Vc-(Vk-\Delta V))/2\Delta V)+At(k+1)\cdot(Vc-(Vk-\Delta V))/2\Delta V \quad (4)$$

Alternatively, if the equation (5) below is met, the target acceleration/deceleration value At is determined according to the equation (6) below.

$$Vk+\Delta V \leq Vc \leq V(k+1)-\Delta V+tm \quad (5)$$

$$At \leftarrow At(k+1) \quad (6)$$

where V(k+1) indicates the vehicle speed at the boundary between the vehicle speed range L(k+1) within which the target acceleration/deceleration map k+1 is selected and a vehicle speed range L(k+2) within which the target acceleration/deceleration map k+2 following the target acceleration/deceleration map k+1 is selected, and ΔV indicates a preselected speed parameter for defining a given speed range. The vehicle speed range Lk is lower than the vehicle speed range L(k+1) and meets the relation of Lk>2·ΔV.

The equation (4) shows that At becomes close to Atk as Vc approaches (Vk−ΔV) and to At(k+1) as Vc approaches (Vk+ΔV). This achieves a continuous change in target acceleration/deceleration value At even when the vehicle speed range L within which the vehicle speed Vc lies is changed to change one of the target acceleration/deceleration maps 1 to N to another.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An automatic deceleration control method for a vehicle comprising:

determining a brake pressure control command when decelerating the vehicle based on a deceleration difference between a target deceleration value determined according to driving conditions of the vehicle and an actual measured deceleration value of the vehicle, the brake pressure control command causing the actual deceleration value of the vehicle to change towards the target deceleration;

correcting said brake pressure control command by modifying the deceleration difference based on advancing a phase of the target deceleration value to compensate for a time delay between output of the brake pressure control command and actual deceleration of the vehicle in response to the brake pressure control command; and adjusting brake pressure acting on a wheel of the vehicle in response to said corrected brake pressure control command to decelerate the vehicle.

2. An automatic deceleration control method as set forth in claim 1, wherein advancing the phase of the target deceleration value is based on the deceleration difference between the target deceleration value and the actual deceleration and a change in target deceleration values.

3. An automatic deceleration control method as set forth in claim 2, wherein the change in the target deceleration value is a measure of a change in the target deceleration value over a given period of time.

4. An automatic deceleration control method as set forth in claim 2, wherein the change in the target deceleration value is a value derived by differentiating target deceleration values with respect to time.

5. An automatic deceleration control method as set forth in claim 1, wherein the target deceleration value is determined by using an actual vehicle speed to index target deceleration maps which show relations between the driving condition and the target deceleration for preselected different vehicle speeds.

6. An automatic deceleration control method as set forth in claim 5, wherein the target deceleration value is determined by performing a weighted averaging operation on two target deceleration values derived from two of the target deceleration maps corresponding to two preselected different vehicle speeds near the actual vehicle speed, the weighted averaging operation being based on the two preselected different vehicle speeds and the actual vehicle speed.

7. An automatic deceleration control method for a vehicle comprising:

determining a brake pressure control command when decelerating the vehicle based on a deceleration difference between a target deceleration value determined according to driving conditions of the vehicle and an actual measured deceleration value of the vehicle, the brake pressure control command causing the actual deceleration value of the vehicle to change towards the target deceleration;

correcting said brake pressure control command by modifying the deceleration difference based on advancing a phase of the deceleration difference between the target deceleration value and the actual deceleration value to compensate for a time delay between output of the brake pressure control command and actual deceleration in response to the brake pressure control command; and adjusting brake pressure acting on a wheel of the vehicle in response to said corrected brake pressure control command to decelerate the vehicle.

8. An automatic deceleration control method as set forth in claim 7, wherein advancing the phase of the deceleration difference is based on a change in the difference between the target deceleration value and the actual deceleration of the vehicle.

9. An automatic deceleration control method as set forth in claim 8, wherein the change in deceleration difference is a measure of a change in the deceleration difference over a given period of time.

10. An automatic deceleration control method as set forth in claim 9, wherein the change in the deceleration difference is a value derived by differentiating the difference between the target deceleration and the actual deceleration with respect to time.

11. A storage medium storing therein a program to be executed by a computer for automatic deceleration control of a vehicle said program comprising the logical steps:

determining a brake pressure control command when decelerating the vehicle based on a deceleration difference between a target deceleration value determined according to driving conditions of the vehicle and an actual measured deceleration value of the vehicle, the brake pressure control command causing the actual deceleration of the vehicle to change towards the target deceleration;

correcting said brake pressure control command by modifying the deceleration difference based on advancing a phase of the target deceleration value to compensate for a time delay between output of the brake pressure control command and actual deceleration of the vehicle in response to the brake pressure control command; and adjusting brake pressure acting on a wheel of the vehicle in response to said corrected brake pressure control command to decelerate the vehicle.

12. A storage medium as set forth in claim 11, wherein advancing the phase of the target deceleration value is based on the deceleration difference between the target deceleration value and the actual deceleration and a change in target deceleration values.

13. A storage medium as set forth in claim 12, wherein the change in the target deceleration value is a measure of a change in the target deceleration value over a given period of time.

14. A storage medium as set forth in claim 12, wherein the change in the target deceleration value is a value derived by differentiating the target deceleration values with respect to time.

15. A storage medium as set forth in claim 11, wherein the target deceleration value is determined by using an actual measured speed of the vehicle to index target deceleration maps which show relations between the driving condition and the target deceleration for preselected different vehicle speeds.

16. A storage medium as set forth in claim 15, wherein the target deceleration value is determined by performing a weighted averaging operation on two target deceleration values derived from two of the target deceleration maps corresponding to two preselected different vehicle speeds near the actual measured speed of the vehicle, the weighted averaging operation being based on the two preselected different vehicle speeds and the actual measured speed of the vehicle.

17. A storage medium storing therein a program to be executed by a computer for automatic deceleration control of a vehicle, said program comprising the logical steps:

determining a brake pressure control command when decelerating the vehicle based on a deceleration difference between a target deceleration signal determined according to driving conditions of the vehicle and an actual measured deceleration of the vehicle, the brake pressure control command causing the actual deceleration of the vehicle to change towards the target deceleration;

correcting said brake pressure control command by modifying the deceleration difference based on advancing a phase of the deceleration difference between the target deceleration and the actual deceleration value to compensate for a time delay between output of the brake pressure control command and actual deceleration in response to the brake pressure control command; and adjusting brake pressure acting on a wheel of the vehicle in response to said corrected brake pressure control command to decelerate the vehicle.

18. A storage medium as set forth in claim 17, wherein advancing the phase of the deceleration difference is based on a change in difference between the target deceleration value and the actual deceleration of the vehicle.

19. A storage medium as set forth in claim 18, wherein the change in deceleration difference is a measure of a change in the deceleration difference over a given period of time.

20. A storage medium as set forth in claim 19, wherein the change in the deceleration difference is a value derived by differentiating the difference between target deceleration values and the actual deceleration with respect to time.

21. An automatic deceleration control apparatus for a vehicle comprising:

a deceleration detecting sensor detecting an actual deceleration of the vehicle;

driving condition determining means for determining driving conditions of the vehicle;

target deceleration determining means for determining a target deceleration according to the driving conditions of the vehicle determined by said driving condition determining means;

deceleration difference determining means for determining a deceleration difference between the target deceleration and the actual deceleration detected by said deceleration detecting sensor;

brake pressure control command determining means for determining a brake pressure control command to use in decelerating the vehicle based on the deceleration difference determined by said deceleration difference determining means;

correcting means for correcting said brake pressure control command by modifying the deceleration difference based on advancing a phase of the target deceleration so as to compensate for a time delay between output of the brake pressure control command and actual detection of the vehicle in response to the brake pressure control command; and a brake actuator adjusting brake pressure acting on a wheel of the vehicle in response to said corrected brake pressure control command to thereby decelerate the vehicle.

22. An automatic deceleration control apparatus as set forth in claim 21, wherein advancing the phase of the target deceleration is based on the deceleration difference between the target deceleration and the actual deceleration and a change in the target deceleration.

23. An automatic deceleration control apparatus as set forth in claim 22, wherein the change in target deceleration is a measure of a change in the target deceleration over a given period of time.

24. An automatic deceleration control apparatus as set forth in claim 22, wherein the change in the target deceleration is a value derived by differentiating the target deceleration with respect to time.

25. An automatic deceleration control apparatus as set forth in claim 21, further comprising a vehicle speed sensor measuring a vehicle speed of the vehicle, and wherein the target deceleration is determined by using the vehicle speed measured by said vehicle speed sensor to index target deceleration maps which show relations between the driving condition and the target deceleration for preselected different vehicle speeds.

26. An automatic deceleration control apparatus as set forth in claim 25, wherein the target deceleration is determined by performing a weighted averaging operation on two target decelerations derived from two of the target deceleration maps corresponding to two preselected different vehicle speeds near the actual vehicle speed, the weighted averaging operation being based on the two preselected different vehicle speeds a nd the vehicle speed.

27. An automatic deceleration control apparatus for a vehicle comprising:

a deceleration detecting sensor detecting an actual deceleration of the vehicle;

driving condition determining means for determining driving conditions of the vehicle;

target deceleration determining means for determining a tar get deceleration according to the driving conditions of the vehicle determined by said driving condition determining means;

deceleration difference determining means for determining a deceleration difference between the target deceleration and the actual deceleration detected by said deceleration detecting sensor;

brake pressure control command determining means for determining a brake pressure control command to use in decelerating the vehicle based on the deceleration difference determined by said deceleration difference determining means;

correcting means for correcting said brake pressure control command by modifying the deceleration difference based on advancing a phase of the deceleration difference between the target deceleration and the actual deceleration so as to compensate for a time delay between output of the brake pressure control command and actual detection of the vehicle in response to the brake pressure control command; and a brake actuator adjusting a brake pressure acting on a wheel of the vehicle in response to said corrected brake pressure control command to thereby decelerate the vehicle.

28. An automatic deceleration control apparatus as set forth in claim 27, wherein advancing the phase of the deceleration difference is based on a change in difference between the target deceleration and the actual deceleration of the vehicle.

29. An automatic deceleration control apparatus as set forth in claim 28, wherein the change in deceleration difference is a measure of a change in the deceleration difference over a given period of time.

30. An automatic deceleration control apparatus as set forth in claim 29, wherein the change in the deceleration difference is a value derived by differentiating the difference between the target deceleration and the actual deceleration with respect to time.

31. A distance control apparatus for controlling a distance between a vehicle and an obstacle present ahead of the vehicle comprising:

a deceleration detecting sensor detecting an actual deceleration of the i vehicle;

driving condition determining means for determining driving conditions of the vehicle;

target deceleration determining means for determining a target deceleration according to the driving conditions of the vehicle determined said driving condition determining means;

deceleration difference determining means for determining a deceleration difference between the target deceleration of the vehicle and the actual deceleration of the vehicle detected by said deceleration detecting sensor;

brake pressure control command determining means for determining a brake pressure control command to use in decelerating the vehicle based on the deceleration difference determined by said deceleration difference determining means;

correcting means for correcting said brake pressure control command by modifying the deceleration difference based on advancing a phase of the target deceleration so as to compensate for a time delay between output of the brake pressure control command and the actual deceleration of the vehicle in response to the brake pressure control command; and a brake actuator adjusting a brake pressure acting on a wheel of the vehicle in response to said corrected brake pressure control command to decelerate the vehicle to thereby bring the distance between the vehicle and the obstacle into agreement with a preselected target distance.

32. A distance control apparatus as set forth in claim 31, wherein advancing the phase of the target deceleration is based on the deceleration difference between the target deceleration and the actual deceleration and a change in the target deceleration.

33. A distance control apparatus as set forth in claim 32, wherein the change in target deceleration is a measure of a change in the target deceleration over a given period of time.

34. A distance control apparatus as set forth in claim 32, wherein the change in the target deceleration is a value derived by differentiating the target deceleration with respect to time.

35. A distance control apparatus as set forth in claim 31, further comprising a vehicle speed sensor measuring a vehicle speed of the vehicle, and wherein the target deceleration is determined by using the vehicle speed measured by said vehicle speed sensor to index target deceleration maps which show relations between the driving condition and the target deceleration for preselected different vehicle speeds.

36. A distance control apparatus as set forth in claim 35, wherein the target deceleration is determined by performing a weighted averaging operation on two target decelerations derived from two of the target deceleration maps corresponding to two preselected different vehicle speeds near the actual vehicle speed, the weighted averaging operation being based on the two preselected different vehicle speeds and the vehicle speed.

37. A distance control apparatus for controlling a distance between a vehicle and an obstacle present ahead of the vehicle comprising:

a deceleration detecting sensor detecting an actual deceleration of the vehicle;

driving condition determining means for determining driving conditions of the vehicle;

target deceleration determining means for determining a target deceleration according to the driving conditions of the vehicle determined by said driving condition determining means;

deceleration difference determining means for determining a deceleration difference between the target deceleration of the vehicle and the actual deceleration of the vehicle detected by said deceleration detecting sensor;

brake pressure control command determining means for determining a brake pressure control command to use in decelerating the vehicle based on the deceleration difference determined by said deceleration difference determining means;

correcting means for correcting said brake pressure control command by modifying the deceleration difference based on advancing a phase of the deceleration difference between the target deceleration and the actual deceleration so as to compensate for a time delay between output of the brake pressure control command and the actual deceleration of the vehicle in response to the brake pressure control command; and a brake actuator adjusting a brake pressure acting on a wheel of the vehicle in response to said corrected brake pressure control command to decelerate the vehicle to thereby bring the distance between the vehicle and the obstacle into agreement with a preselected target distance.

38. A distance control apparatus as set forth in claim 37, wherein advancing the phase of the deceleration difference is based on a change in difference between the target deceleration and the actual deceleration of the vehicle.

39. A distance control apparatus as set forth in claim 38, wherein the change in deceleration difference is a measure of a change in the deceleration difference over a given period of time.

40. A distance control apparatus as set forth in claim 39, wherein the change in the deceleration difference is a value derived by differentiating the difference between the target deceleration and the actual deceleration with respect to time.

* * * * *